Feb. 22, 1966    F. D. WERNER    3,237,139
HOLLOW TEMPERATURE SENSOR
Filed Sept. 5, 1962

INVENTOR.
Frank D. Werner
BY
Dugger, Braddock, Johnson & Westman
ATTORNEYS

United States Patent Office 3,237,139
Patented Feb. 22, 1966

3,237,139
HOLLOW TEMPERATURE SENSOR
Frank D. Werner, Minneapolis, Minn., assignor to Rosemount Engineering Company, Minneapolis, Minn., a corporation of Minnesota
Filed Sept. 5, 1962, Ser. No. 221,557
4 Claims. (Cl. 338—25)

The present invention has relation to temperature sensors and more particularly to a wound resistance wire temperature sensor which has a hollow core and is designed to minimize external stress in the resistance wire.

The present invention illustrates a structure wherein a resistance wire is wound around a mandrel, is covered with a suitable electrically insulating coating and is then coated with a coating of material having the same or nearly the same temperature coefficient of the expansion as the resistance wire. As the ambient temperature changes the wire and outer coating will expand or contract at the same rate and the insulating material, which may have a different coefficient of expansion, will be forced to follow the expansion of the coating and will have very little stress effect on the resistance wire. The unit may be inserted into an outside shell if desired.

If a heavy layer of electrical insulation is used the same result will be obtained as long as the insulating material is not stiff in relation to the outer coating. The important feature is the control of expansion by the outer coating rather than by the insulation.

The resistance wire is wound over a mandrel before coating. The mandrel can be later removed, thus minimizing the heat capacity of the temperature sensor and making responses much more rapid. The mandrel is retained within the temperature sensor during forming as well as during any mechanical finishing operations on the exterior surface of the sensor.

The mandrel can be left in place when the sensor is placed into its outer metallic sheath to prevent mechanical damage to the insulation and resistance wire.

The insulation used on the resistance wire may be a suitable ceramic material. As ceramic materials which reasonably match the coefficient of expansion of platinum are available, only one coating has to be used over the wire. After the ceramic material has been applied to the wound wire, the outer surface of the ceramic material will be mechanically finished to a smooth cylindrical or conical surface so that it will fit closely and very tightly within the outer metal shell. The resistance to heat transfer from the shell to the temperature sensing element is minimized. During this mechanical finishing the mandrel will be left in place to support the thin wall formed by the ceramic insulation which is deposited on the wire.

It is an object of the present invention to present a wound wire temperature sensor constructed by helically winding a wire onto a mandrel.

It is a further object of the present invention to present a hollow temperature sensor which can be machined to close tolerance and inserted into an outer metal shell.

It is a still further object of the present invention to present a hollow temperature sensor in which the stress in the resistance wire caused by differential expansion between resistance wire and an electrical insulation coating is held at a minimum.

Other and further objects are those inherent in the invention herein illustrated, described, and claimed, and will become apparent as the description proceeds.

To the accomplishment of the aforegoing and related end, this invention then comprises features hereinafter fully described and particularly pointed out in the claims, the following description setting forth in detail certain illustrative embodiments of the invention, these being indicative, however of but a few of the various ways in which the principles of the invention may be employed.

The invention is illustrated with reference to the drawings wherein.

Figure 1:
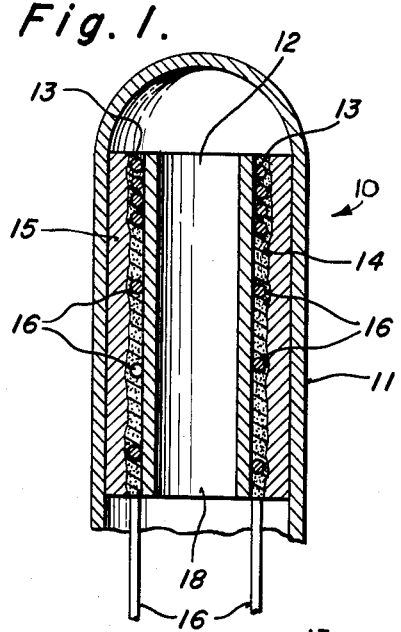
FIG. 1 is a vertical sectional view of a wound wire resistance temperature sensor made according to the present invention.

Referring to the drawings and the numerals of reference thereon, a hollow temperature sensor 10 includes an outer shell 11 and an inner temperature sensing element 12. The temperature sensing element 12 is comprised of a tubular member which has a plurality of helically wound coils of resistance wire 13, usually made of platinum, held in position by a thin layer 14 of electrical insulation material for example, aluminum oxide. A second layer 15 is deposited over the insulation coating and is relatively thick. The layer 15 is a metal or other material having substantially the same coefficient of expansion on the resistance wire. The temperature sensing wire 13 is illustrated adjacent a first end of the sensing element. Lead wires 16 are attached to resistance wire 13 and also helically wound and held embedded in insulation coating 14.

The temperature sensing element 12 is made by winding the resistance wire 13 around a tubular mandrel 18 and also winding the lead wires around the mandrel for a portion of the length thereof. The mandrel 18 can be a solid cylinder if desired.

In the first form, after the wire has been wound on the mandrel 18, the entire assembly is coated with a thin layer 14 of suitable insulation material, such as aluminum oxide, which is applied by flame spraying or other suitable methods. The outer coating 15 is then placed over the insulation. The outer coating for example, can be platinum, the same material as the wire.

The wires 13 are mechanically supported by the platinum and the expansion of the sensor will be controlled by the platinum rather than by the aluminum oxide. The wire will not have external stress therein caused by differential expansion between the wire and the insulation coating. The outer surface of the platinum can be finished to a close tolerance. The mandrel will be left in place if the unit is mechanically finished to prevent collapse of the sensor element.

The core 18 can be removed from the element by pulling or pushing it out or by chemical or electrochemical means. The tubular configuration aids in removing the core by chemical means. If chemically removed, the core material has to be selected so that it can be removed with chemicals which will not harm the insulation or the outer shell.

The tight fit between the outer shell 11 and the sensor 12 minimizes the resistance to heat transfer therebetween and results in more accurate temperature readings.

Figure 2:
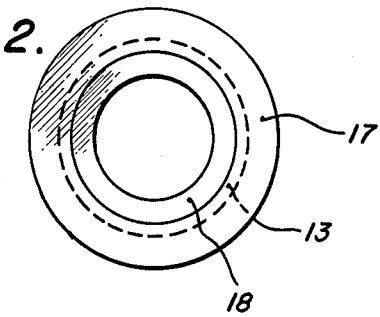
FIG. 2 is an end elevational view of the device of FIG. 3.
Figure 3:
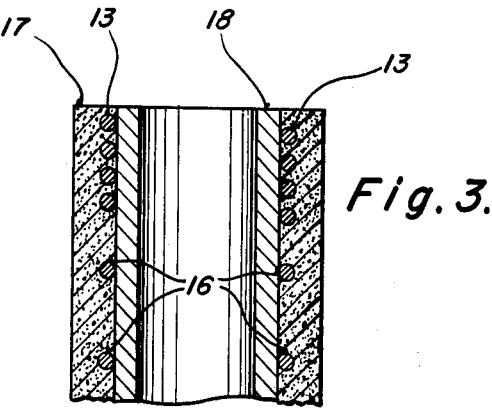
FIG. 3 is an enlarged vertical sectional view of a temperature sensor element constructed according to a modified form of the present invention.

As shown in FIG. 2, if a ceramic material that has substantially the same coefficient of expansion as the resistance wire is used for insulation, only one coating needs to be applied. The wire 13 is wound over mandrel 18 and a ceramic material 17 is applied over the wire. The coating is relatively thick and will support the wire. The mandrel can be removed as before.

Figure 4:
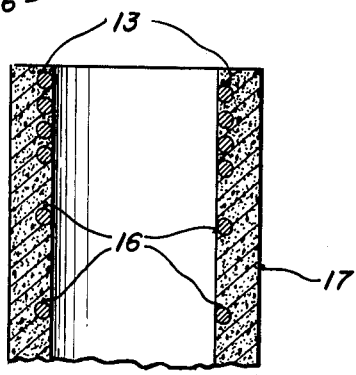
FIG. 4 is a fragmentary sectional view of the device of FIG. 3 with a mandrel removed.
Figure 5:
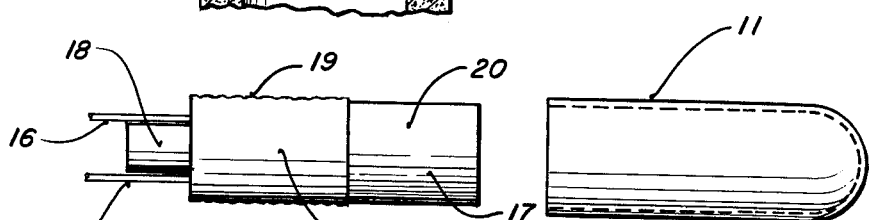
FIG. 5 is an exploded view of a partially completed temperature sensor made according to the present invention.

The outer surface of the ceramic material must be machined or mechanically finished so that it is smooth and held to a close dimensional tolerance before it is placed into an outer shell, as explained before. As shown in FIG. 4, the cylindrical mandrel 18 is left in place when the outer surface of the sensing element is mechanically worked. As can be seen in FIGURE 5 the portion 19 is rough, and the surface in the portion 20 has been finished so that it can easily be slid into shell 11 and a snug fit will result.

Removing the cylindrical mandrel 18, either by pushing it out of the element or by chemically etching it away reduces the heat capacity of the temperature sensor to a minimum and the sensor has an extremely rapid response to temperature change.

As can be seen, the outer coating of the sensor, either platinum over an insulation coating or the ceramic coating, controls the expansion thereof. Thus when subjected to temperature change, any change in dimension due to thermal expansion of the outer coating will be matched by the expansion of the wire and no detrimental effects are observed.

If the outer shell is made of the same material or of a material having substantially the same coefficient of thermal expansion as the resistance wire, there will be still less differential expansion induced strain in the resistance wire. The wire will change in dimension at the same rate as the shell. Where two coatings are used, the insulating coating, even if it has a much different coefficient of thermal expansion than the platinum wire, for example, will be mechanically forced to follow the expansion of the outer coating. The effect of the difference of rates of expansion between the resistance wire and the insulating coating does not result in stress on the wire itself.

Thus any change in resistance in coils of the sensing wire is caused entirely by the temperature being measured. Stress induced by differential expansion causes variations in resistance which causes a shift of the resistance temperature calibration of the sensor and results in erroneous measurements.

Figure 6:
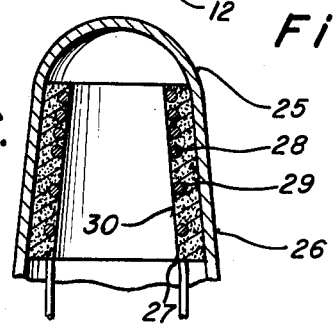
FIG. 6 is a vertical sectional view of a temperature sensor made according to a further modified form of the present invention.

In FIG. 6 a variation of the temperature sensor is shown. In this form of the invention a conically shaped temperature sensor 25 has a conical outer shell 26 and a conical inner temperature sensing element 27. This conical inner temperature sensing element is formed in exactly the same manner as before having resistance wire 28, leads 29 and insulation material 30. The conical taper to the mandrel makes it much easier to mechanically remove after the temperature sensor has been assembled.

The wire 28 is wound around a conical mandrel which can be removed after the sensing element is completely formed, as in the previous forms of the invention. The mandrel can also be used to support the sensing element during any finishing operations on the outer surface thereof and can be used to support the element when it is inserted into the outer shell 26.

The instrumentation used with the temperature sensing element of the present invention is of any conventional bridge arrangement which will properly reflect temperature changes.

It should be noted that additional layers of resistance wires can be wound on the first layers, either by using insulated wire or by using bare wire, depositing the insulating coating and then applying more wire.

As many widely apparently different embodiments of this invention may be made without departing from the spirit and scope thereof, it is to be understood that we do not limit ourselves to the specific embodiments herein.

What is claimed is:

1. A temperature sensor comprising, a helical wound coil of wire of a metal capable of changing its electrical resistance in relation to temperature, the turns of said coil being separated from each other, said coil being oriented so as to have its turns around a common centerline axis and with the innermost surface of the wire forming the turns of the coil at a common surface of revolution generated around said centerline as an axis, an insulating filling of refractory oxide of metal enveloping said coil and extending as a mass from said common surface and thence outwardly to an outer surface of said insulating filling, which surface is spaced outwardly beyond said coil, and a metal sheath around the exterior surface of the insulating coating and attached thereto and composed of a metal having a heat coefficient of expansion such that, with the insulating filling to which it is attached, the resultant unit of insulating filling and metal sheath will have a heat coefficient of expansion substantially the same as the metal of which the helical wound coil is made for supporting the helical coil without stress at varying temperatures.

2. The temperature sensor of claim 1 further characterized in that the metal sheath has substantially the same temperature coefficient of expansion as the metal of which said coil is made.

3. The temperature sensor of claim 1 further characterized in that the outer surface of the insulating filling and the inner surface of the metal sheath are irregular and are physically attached and are in thermal conductive relation with each other and the outer surface of the metal sheath is a smooth and regular surface generated around said centerline of the sensor.

4. The temperature sensor of claim 3 further characterized in that a protective closed-end thin-walled shell is provided as a cover outside the metal sheath.

References Cited by the Examiner

UNITED STATES PATENTS

| | | | |
|---|---|---|---|
| 1,411,396 | 4/1922 | Wilson et al. | 338—28 |
| 2,332,596 | 10/1943 | Pearson | 338—262 |
| 2,372,840 | 4/1945 | Mattern | 338—28 |
| 2,397,568 | 4/1946 | Seaman | 338—265 |
| 2,802,925 | 8/1957 | Von Seelen et al. | 338—28 |
| 2,936,516 | 5/1960 | Adair | 29—155.68 |
| 2,942,222 | 6/1960 | Nelson | 338—243 |
| 2,957,153 | 10/1960 | Greenberg | 338—28 |
| 2,973,495 | 2/1961 | Greenberg | 338—28 |
| 2,985,951 | 5/1961 | Solow | 29—155.68 |
| 3,005,171 | 10/1961 | Beckman | 338—28 |
| 3,037,179 | 5/1962 | Otto | 338—28 |

FOREIGN PATENTS

| | | |
|---|---|---|
| 674,484 | 6/1952 | Great Britain. |
| 768,117 | 2/1957 | Great Britain. |

RICHARD M. WOOD, *Primary Examiner.*